No. 12,788. REISSUED APR. 28, 1908.

J. HUSSONG.

DYEING MACHINE.

APPLICATION FILED JAN. 3, 1908.

2 SHEETS—SHEET 1.

Witnesses,
William H. Moore.
Geo. B. Coppies

Inventor,
Joseph Hussong
by his Attorneys
Howson & Howson

No. 12,788. REISSUED APR. 28, 1908.

J. HUSSONG.

DYEING MACHINE.

APPLICATION FILED JAN. 3, 1908.

2 SHEETS—SHEET 2.

Witnesses,
Augustus B. Coppes
William H. Rivoir.

Inventor
Joseph Hussong
by his Attorneys
Howson & Howson

UNITED STATES PATENT OFFICE.

JOSEPH HUSSONG, OF CAMDEN, NEW JERSEY, ASSIGNOR TO HUSSONG DYEING MACHINE COMPANY, OF GROVEVILLE, NEW JERSEY, A CORPORATION OF NEW JERSEY.

DYEING-MACHINE.

No. 12,788. Specification of Reissued Letters Patent. Reissued April 28, 1908.

Original No. 661,343, dated November 6, 1900, Serial No. 726,542. Application for reissue filed January 3, 1908. Serial No. 409,243.

*To all whom it may concern:*

Be it known that I, JOSEPH HUSSONG, a citizen of the United States, and a resident of Camden, New Jersey, have invented certain Improvements in Dyeing-Machines, of which the following is a specification.

My invention relates to certain improvements in dyeing-machines whereby the dye liquor will be circulated through the yarn. This object I attain in the following manner, reference being had to the accompanying drawings, in which—

Figure 1:
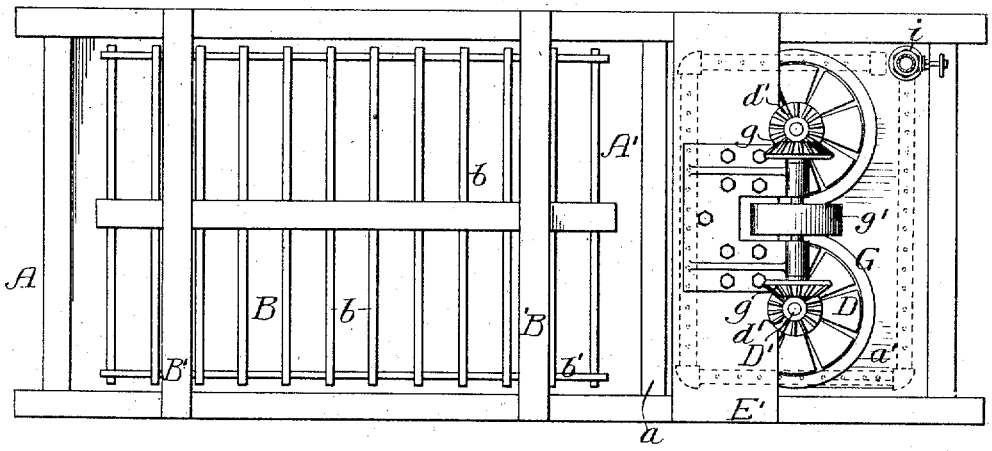
Figure 2:
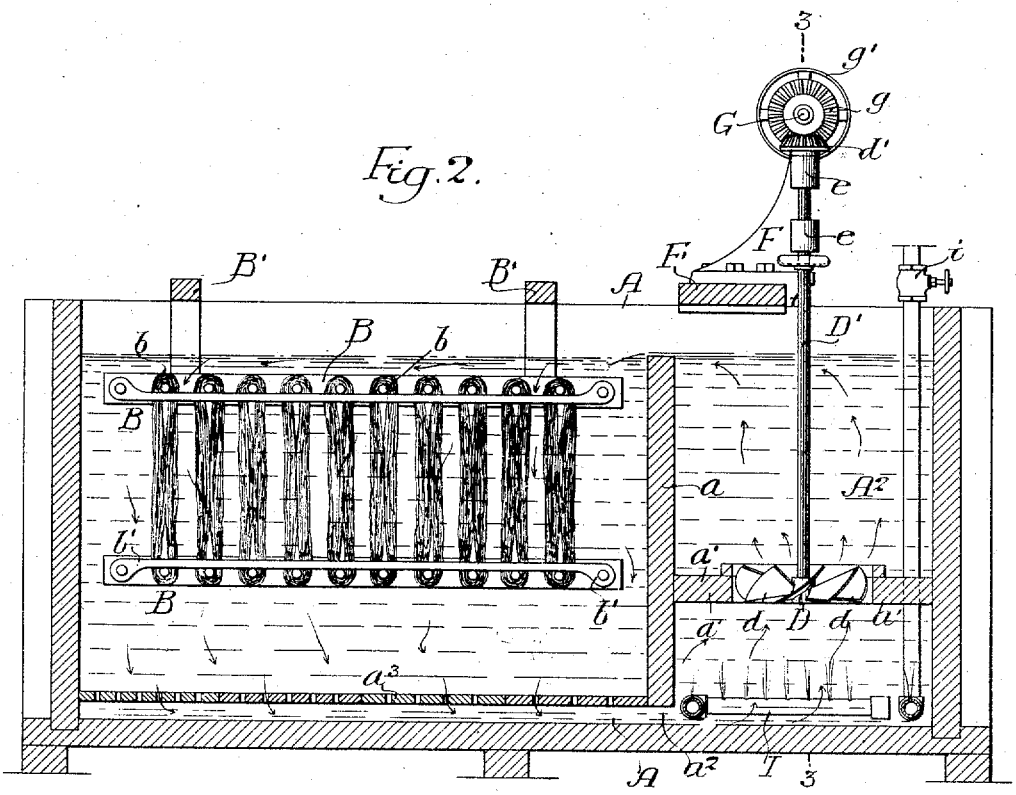
Figure 3:
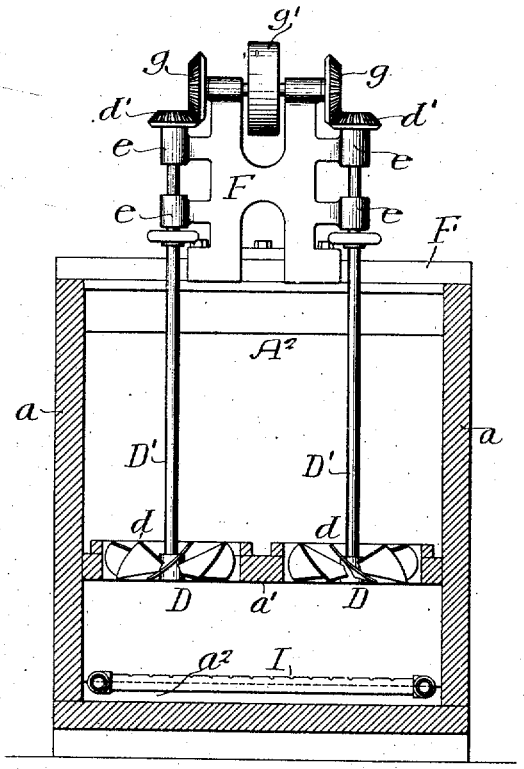

Figure 1 is a plan view of my improved dyeing-machine. Fig. 2 is a longitudinal sectional view. Fig. 3 is a transverse sectional view on the line 3—3 Fig. 2.

Heretofore it has been the general practice to move the yarn in the liquor in the vat so as to thoroughly dye the yarn. This is objectionable in many cases on account of the delicate condition of the yarn, and it is often desirable to either dye the yarn in bulk, in hanks, or in skeins, as shown in the drawings.

By my invention I can circulate the dye liquor through the yarn either when arranged in skeins or hanks, on sticks, or placed in bulk in the vat.

In the accompanying drawings, A is a vat of the ordinary size, divided into two sections by a transverse partition *a*. In the section A′ is mounted the yarn to be dyed. In the present instance I have shown a rack B suspended from rails B′, resting on the top of the vat, and extending from each side of the rails B′ B′ are sticks *b*, on which the yarn is placed. Locking bars *b′* are used to prevent the yarn being displaced by the movement of the liquor in the vat. The frame containing the hanks can be readily removed from the vat when desired, and a frame, with yarn to be dyed, can be placed in its stead, without interfering with the free flow of liquor.

$A^2$ is a small section of the vat, in which is situated the mechanism for creating a current to the liquor.

*a′* is a partition dividing the section $A^2$ into two parts, and in the partition is an opening, and in the opening is mounted a wheel D, having a series of blades *d d*. This wheel is mounted on the lower end of a vertical shaft D′, adapted to bearings *e e* in a bracket F, secured to a cross-beam F′ on the vat. I preferably provide two wheels for each vat, as shown in Fig. 1, and there are two openings in the partitions *a′*, in which the wheels D travel.

On the upper end of each shaft D′ is a beveled wheel *d′* meshing with bevel-wheels *g* on a driven shaft G, having a belted pulley *g′*, adapted to receive a driving-belt, so that when the shafts are set in motion both propelling-wheels will be turned.

The partition *a*, forming the two compartments A′ and $A^2$ does not extend to the bottom of the vat, but is raised sufficiently from the bottom to form a channel $a^2$ for the passage of liquor from the compartment A′ to the compartment $A^2$, so that when the wheels D are turned the liquor is circulated, being drawn from the compartment A′ through the passage $a^2$ into the lower section of the compartment $A^2$, and then drawn up into the upper portion of said section, flowing over the partition *a′* into the section A′, containing the yarn.

In order to more evenly distribute the liquor in the section A′ of the vat, I provide a perforated bottom $a^2$. This bottom is preferably made in sections, and the perforations are so spaced apart that the liquor will not have a tendency to circulate merely around the partition *a*, but will circulate through the entire section, thus distributing the dye liquor evenly.

It will be noticed on referring to Fig. 2 that there is a less number of holes in the perforated floor at the partition *a* than at the opposite end of the vat; but instead of increasing the number of holes the diameter of the holes may be increased, gaining the same result.

I preferably heat the dye liquor by arranging a coil of pipe I in the bottom of the lower portion of the section $A^2$, and this pipe extends up through the section $A^2$ and is provided with a valve *i* to regulate the flow of steam. I perforate the upper portion of the coil of pipe, so that the steam will escape into liquor as it is drawn up by the propelling wheels.

I claim as my invention:—

1. The combination in a dye-vat, of a partition dividing the vat into two sections, one section containing the material to be dyed and having a perforated floor arranged near the bottom of the vat for the passage of the dye liquor, and means on the other side of the partition for maintaining a circulation of the dye liquor through the vat, said dye liquor being drawn under the partition from the dyeing-section and forced over said partition into the dyeing-section, substantially as described.

2. The combination in a dye-vat, of a vertical transverse partition dividing the vat into two sections, one section containing the material to be dyed and having a perforated floor arranged near the bottom of the vat for the passage of the dye liquor, and means in the other section for maintaining a circulation of the dye liquor through the vat, said dye liquor being drawn under the partition from the dyeing section and forced over said partition into the dyeing section, substantially as described.

3. The combination in a dye vat, of a vertical transverse partition dividing the vat into two sections, one section containing the material to be dyed and having a perforated floor arranged near the bottom of the vat for the passage of the dye liquor, and a circulating wheel in the other section for maintaining a circulation of the dye liquor through the vat, said dye liquor being drawn under the partition from the dyeing section and forced over said partition into the dyeing section, substantially as described.

4. The combination of the vat, a partition therein dividing the vat into two sections, said partition stopping short of the bottom so as to form a communicating passage between the two sections, a horizontal partition in one section, one or more openings in said partition, and one or more bladed wheels adapted to the openings; means for driving said wheels so that a current of liquor will flow from one compartment under the partition to the other, and will be discharged over the partition in the first-mentioned section, substantially as described.

5. The combination of a dye-vat having a partition therein stopping short of the bottom thereof, dividing the said vat into two sections, a perforated bottom in that section in which the yarn to be dyed is placed, a horizontal partition in the other section, driving bladed wheels mounted in openings in the said partition so as to create a current and cause the liquor to flow from the dyeing-section under the partition, up through the other section, and over the partition in the dyeing-section, substantially as described.

6. The combination in a dye-vat, a transverse partition therein stopping short of the bottom thereof, a perforated floor in the dyeing-section, a horizontal partition having one or more openings therein, one or more bladed wheels mounted in said openings, means for driving said wheels, a coil of steam-pipe mounted in the bottom portion directly under the horizontal partition, said steam-pipes having openings so that the steam will mingle in the dyeing liquor as it is drawn upward by the bladed wheels, substantially as described.

7. The combination in a dye-vat, of a transverse partition dividing the vat into two sections, a horizontal partition having one or more openings therein arranged in one of said sections, bladed circulating-wheels mounted in said horizontal partition, means for driving said wheels so that a circulation of the dye liquor will be maintained, being drawn under the partition from the dyeing-section and forced over the partition into the dyeing-section, and a perforated floor in the dyeing-section, the openings in said floor being spaced apart at different distances, so that an even circulation of the dye liquor may be maintained throughout the dyeing-section, substantially as described.

In testimony whereof I have signed my name to this specification in the presence of two subscribing witnesses.

JOSEPH HUSSONG.

Witnesses:

LAWRENCE M. VERGA,

WM. J. HUSSONG.